United States Patent [19]

Zalesky

[11] Patent Number: 4,747,230
[45] Date of Patent: May 31, 1988

[54] SLUG TRAP
[75] Inventor: Dean R. Zalesky, Aurora, Colo.
[73] Assignee: Randean, Inc., Aurora, Colo.
[21] Appl. No.: 18,963
[22] Filed: Feb. 25, 1987
[51] Int. Cl.[4] .............................................. A01M 1/00
[52] U.S. Cl. ........................................ 43/121; 43/131
[58] Field of Search .............. 220/94 A; 43/121, 124, 43/131, 107

[56] References Cited
U.S. PATENT DOCUMENTS

| | | | |
|---|---|---|---|
| 1,714,666 | 5/1929 | Gring | 43/121 |
| 2,913,140 | 11/1959 | Vuillemenot | 220/94 A |
| 3,529,744 | 9/1970 | Johnson et al. | 220/94 A |
| 3,550,308 | 12/1970 | Ibach | 43/131 |
| 3,772,820 | 11/1973 | Bond | 43/131 |
| 3,854,582 | 12/1974 | Martinelli | 220/94 A |
| 4,277,907 | 7/1981 | Ernest | 43/131 |
| 4,328,637 | 5/1982 | Eichmutler et al. | 43/131 |
| 4,478,349 | 10/1984 | Haverland et al. | 220/94 A |
| 4,497,131 | 2/1985 | Hicks | 43/131 |

*Primary Examiner*—M. Jordan
*Attorney, Agent, or Firm*—William P. O'Meara

[57] ABSTRACT

A slug trap device for use in a garden area or the like for luring and trappingly collecting slugs comprising: a container means for receiving and containing a non-toxic slug bait therein and for receiving and containing slugs therein which are attracted to the bait, having a circular bottom wall and an upstanding generally cylindrical sidewall integrally formed with the circular bottom wall and an outwardly and downwardly extending annular lip integrally formed with the sidewall at an upper portion thereof, the bottom wall and the sidewall defining a cylindrical container cavity; lid means for covering the container means for shielding the container means from rain, the lid means comprising a generally conically shaped wall adapted to extend a substantial radial distance beyond the container means annular lip for making the device resistant to be overturned by an animal, wind or the like; lid attachment means for releasably attaching the lid means to the container means comprising a first and second latch means fixedly attached to the lid means at a bottom surface thereof in diametrically opposed relationship near the periphery of the lid means, the first and second latch means having a generally hook shaped portion adapted to latchingly engage the annular lip portion.

9 Claims, 2 Drawing Sheets

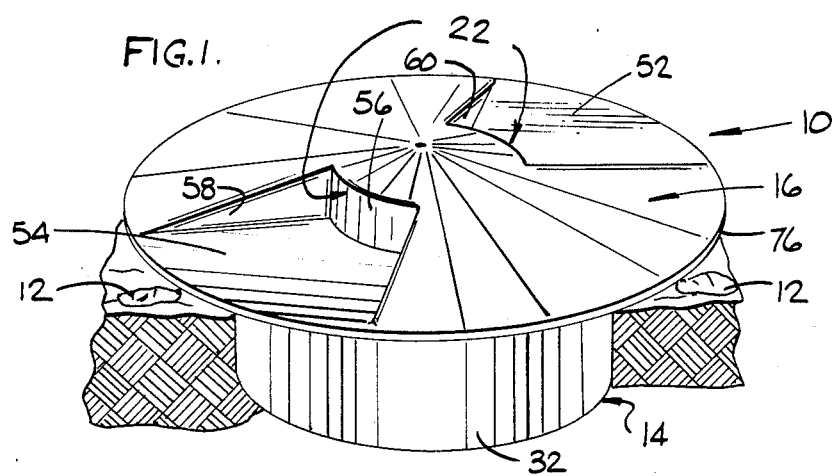
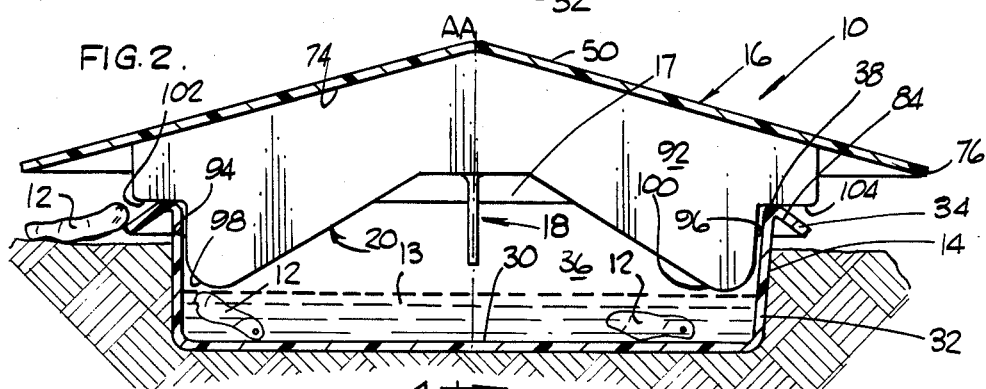
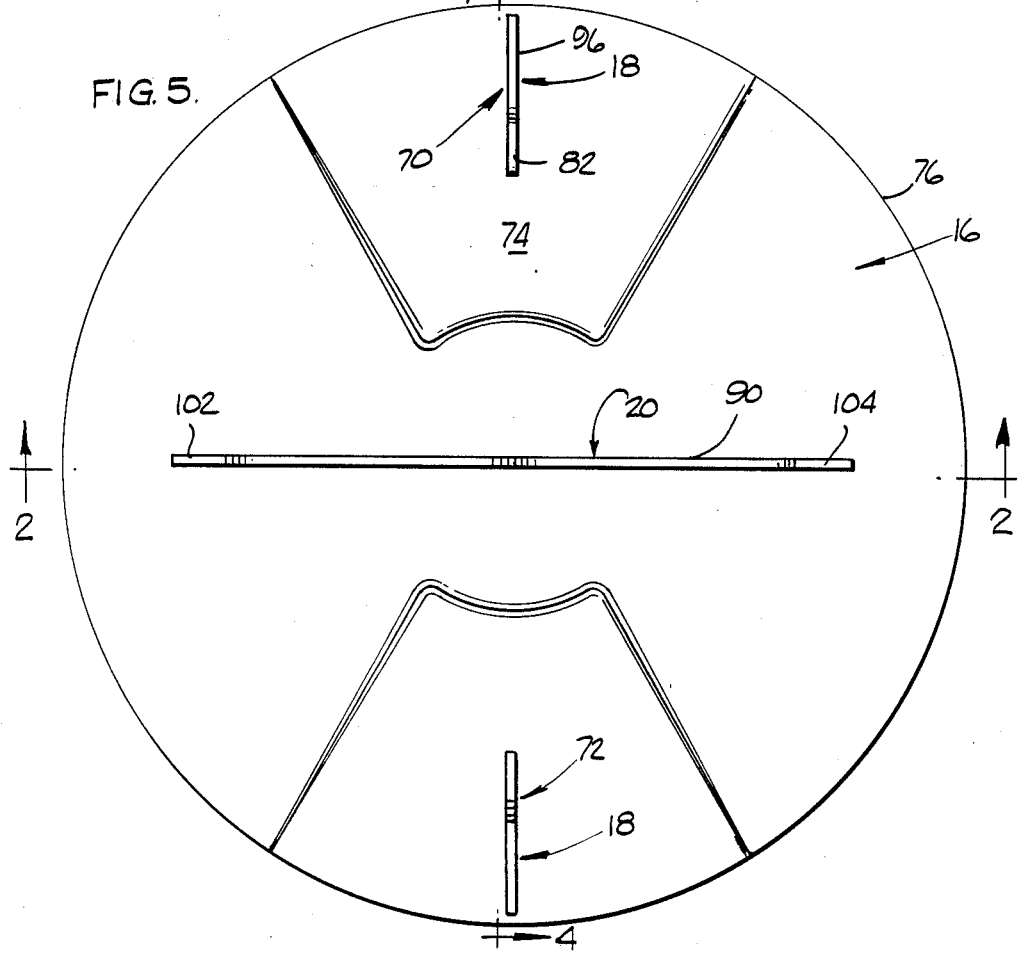

SLUG TRAP

BACKGROUND OF THE INVENTION

The present invention relates generally to slug traps, and, more particularly, to a slug trap including a container and a self-centering lid with an integrally formed handle attachable in snapping relationship to a lip portion of the container which is provided in a stable, low profile configuration.

Slugs are a common garden pest in many areas of the United States. One commonly used method for controlling slugs is spreading of poison onto the surface of the ground. A problem with this approach, however, is that children and animals may also be exposed to the poison. To overcome this problem, a number of snail trap devices have been developed over the years, e.g. U.S. Pat. Nos. 4,328,637; 3,550,308; 2,239,937; 4,251,946; 1,002,919; 4,035,946; and 4,277,907. Prior art slug traps generally include a closed container in which the slug poison is provided. Small access areas are provided which allow entrance of the slugs into the container but which are sufficiently small to prevent children or animals from gaining access to the poison. Such snail traps are generally positioned in holes in the ground or are otherwise anchored to the ground to prevent the traps from being tipped over by wind, animals, etc. Thus, one problem with many prior art devices is instability, requiring a user to engage in preparation activities, such as digging holes or staking, before the device may be used. Another problem has been in the manner in which a closure member for slug containers is provided. Many containers are provided with lids that form a locking structure that are either ineffective or cumbersome to use or which are relatively expensive to produce.

OBJECTS OF THE INVENTION

It is among the objects of the present invention to overcome the above-described problems of prior art slug traps.

It is also an object of the present invention to provide a slug trap which is extremely effective for trapping and disposing of slugs.

It is also an object of the present invention to provide a slug trap which uses non-toxic bait.

It is also an object of the present invention to provide a slug trap which has an easily removable, self-centering, locking lid.

It is also an object of the present invention to provide a slug trap having an integrally formed handle in an upper surface portion of the lid.

It is also an object of the present invention to provide a slug trap in a color which attracts slugs.

It is also an object of the present invention to provide a slug trap having a permanent bottom container.

It is also an object of the present invention to provide a slug trap having a disposable bottom container.

It is also an object of the present invention to provide a slug trap which is inherently stable when positioned on a flat surface.

It is also an object of the present invention to provide a slug trap which is relatively inexpensive to produce.

It is also an object of the present invention to provide a slug trap having a low profile configuration which enables the trap to be easily positioned below bushes and the like.

SUMMARY OF THE INVENTION

The present invention comprises a slug trap device for use in a garden area or the like for luring and trappingly collecting slugs comprising: a container means for receiving and containing a non-toxic slug bait therein and for receiving and containing slugs therein which are attracted to said bait, having a circular bottom wall and an upstanding generally cylindrical sidewall integrally formed with said circular bottom wall and an outwardly and downwardly extending annular lip integrally formed with said sidewall at an upper portion thereof, said bottom wall and said sidewall defining a cylindrical container cavity; lid means for covering said container means for shielding said container means from rain, said lid means comprising a generally conically shaped wall adapted to extend a substantial radial distance beyond said container means annular lip for making the device resistant to be overturned by an animal, wind or the like, said generally conically shaped wall comprising integrally formed handle means therein adapted to facilitate grasping and carrying of the device by grasping of an upper surface of said lid means whereby a person carrying the device is not required to soil his hands by grasping a lower portion of said lid means or said container means; lid attachment means for releasably attaching said lid means to said container means comprising a first and second latch means fixedly attached to said lid means at a bottom surface thereof in diametrically opposed relationship near the periphery of said lid means, said first and second latch means having a generally hook shaped portion adapted to latchingly engage said annular lip portion; centering means for facilitating initial central positioning of said lid means on said container means for enabling engagement of said annular lip of said container means by said latch means and for preventing subsequent radial shifting movement of said lid means.

BRIEF DESCRIPTION OF THE DRAWING

An illustrative and presently preferred embodiment of the invention is shown in the accompanying drawing in which:

FIG. 1 is a perspective view of a slug trap.
FIG. 2 is a cross sectional view of a slug trap positioned below the surface of the ground.
FIG. 5 is a bottom view of a slug trap lid.

DETAILED DESCRIPTION OF THE INVENTION

The slug trap device 10 of the present invention is used with non-toxic bait for luring and trapping slugs 12 of the type commonly found in gardens.

Figure 3:
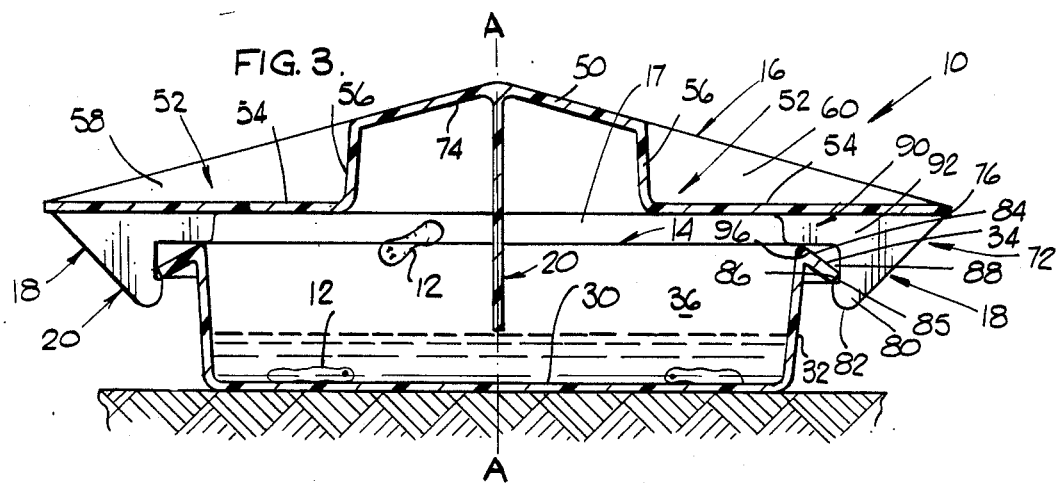
FIG. 3 is a cross sectional view of a slug trap positioned on the surface of the ground.
Figure 4:
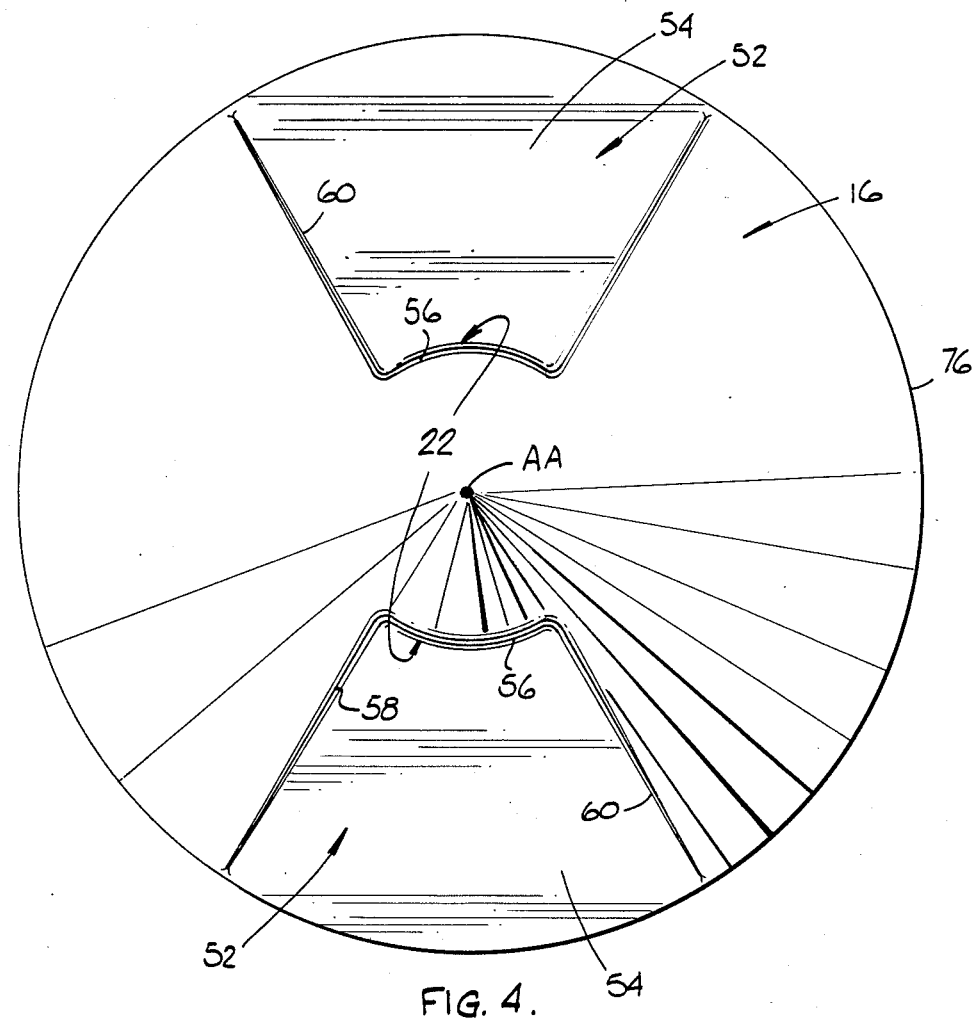
FIG. 4 is a top view of a slug trap lid.

The device 10, in general, comprises a relatively short, cylindrical, container means for holding slug bait 13 and for collecting slugs 12 therein, a generally conical lid means 16 adapted to be attached to a top of the container means 14 in spaced relationship therefrom with the space 17 between the lid means and the container means being sufficiently large to provide an entrance into the container means 14 for slugs 12 attracted by the bait 13. The lid means 16 is considerably larger in diameter than the container means 14 and tends to prevent the container means from being overturned due to the fact that the periphery of the lid means engages the ground as the container is being tipped to prevent further tipping. The lid means is provided with a releasable, locking lid attachment means 18 which engages an annular lip portion of the container means 14. The lid means is also provided with a lid centering means 20 which facilitates initial positioning of the lid means on the container means and which helps maintain the lid means in stable centered relationship above the container means A handle means 22 is provided by recessed portions in the lid means. The overall profile of the device 10 is very low, enabling the device to be positioned in stable relationship on a horizontal surface without need for staking or burying the device, as shown in FIG. 3. The device may also be positioned in a hole to a depth slightly below the upper portion of the container, as illustrated in FIG. 2. In one preferred embodiment of the invention, the device is yellow in color. The color yellow has been found to attract slugs. Having thus described the invention in general, the invention will now be specifically described.

The slug trap device 10 of the present invention comprises a container means 14 for receiving and containing a non-toxic slug bait 13 therein and for receiving and containing slugs 12 therein which are attracted to the bait. The container means has a circular bottom wall 30 and an upstanding generally cylindrical sidewall 32 integrally formed with said circular bottom wall 30 and an outwardly and downwardly extending annular lip 34 integrally formed with the sidewall at an upper portion thereof. The bottom wall and the sidewall define a cylindrical container cavity 36. The bottom wall 30 has a diameter of approximately 3.8 inches, and the sidewall 32 has a height of approximately 1.3 inches. The annular lip 34 has an outside diameter of approximately 4.5 inches and extends downwardly from the point of connection 38 with the top of the sidewall approximately 0.2 inches. The annular lip is inclined downwardly from a plane perpendicular to the top 38 of the sidewall at an angle of approximately 30 degrees. The container means may be constructed from polyethylene plastic in a permanent unit or may be constructed from wax paper to provide a disposable unit. The container means has a substantially constant wall thickness of approximately 0.06 inches and is preferably yellow in color.

The lid means 16 is adapted for covering the container means 14 to shield the container means from rain, animals, etc. The lid means comprises a generally conically shaped wall 50 which is adapted to extend a substantial radial distance beyond the container means annular lip for making the device resistant to be overturned by an animal, wind or the like. The generally conically shaped wall comprises integrally formed handle means 22 therein adapted to facilitate grasping and carrying of the device 10 by grasping of an upper surface of the lid means. Thus a person carrying the device 10 is not required to soil his hands by grasping a lower portion of the lid means or the container means which has been in contact with wet ground, slugs, etc. The conical wall comprises a slope of approximately 15 degrees, a diameter of approximately 6.0 inches, a height of approximately 0.9 inches, and a wall thickness of approximately 0.06 inches and is preferably constructed of polyethylene which is yellow in color The handle means 22 on the lid means is provided by two recessed regions in the generally conically shaped wall. The recessed regions each comprises a generally planar bottom area 54 extending perpendicularly of the central axis AA of said lid means and further comprises a circumferentially extending radially inwardly positioned area 56 integrally connected to said handle bottom area and further comprises a pair of radially extending tapering side areas 58, 60. Planes positioned in alignment with the sidewall areas of the recess would intersect approximately at the central axis AA of the lid means at an angle of approximately 60 degrees. The circumferential areas 56 of the two recessed regions 52 provide surfaces to be grasped for carrying the device 10. The distance between the circumferential areas of said two recessed regions is approximately 1.9 inches.

Lid attachment means 18 are provided for releasably attaching the lid means 16 to the container means 12 and comprise a first and second latch means 70, 72 fixedly attached to the lid means at a bottom surface 74 thereof in diametrically opposed relationship near the peripheral edge 76 of the lid means, the first and second latch means 70, 72 each have a generally hook shaped portion 80, FIG. 3, adapted to latchingly engage annular lip 34. The hook shaped portion 80 comprises a rounded lower edge portion 82 having a radius of approximately 0.09 inches that is adapted to slide over an upper surface 84 of said annular lip. The hook shaped portion also has a generally horizontally extending inner surface 85 having a length of approximately 0.03 inches which is positioned approximately 2.25 inches at the most radially remote portion thereof from the central axis AA of the lid means and which is adapted to snappingly engage a lower edge surface 86 of the container annular lip subsequent to downward sliding movement of the hook portion lower edge portion 82 over the annular lip upper surface 84. Engagement of surfaces 85 and 86 prevents removal of the lid means from the container means. The hook portion inner horizontal surface is positioned to enable the annular lip 34 of the container mean to be moved into nonengaging relationship with surface 85 of the hook shaped portion by inward compression of the sidewall 32 of the container means in regions thereof proximate to the latch means 70, 72 by force applied by a person's thumb and fingers or by upwardly flexing of peripheral 26 portions of the lid means at regions thereof where the latch means 70, 72 are attached to the lid means by grasping of the peripheral regions of the lid means with the finger of each of a person's hands and application of downward pressure at the center of the lid means with the thumbs of the person's hands. The hook shaped portion 80 further comprises an inner vertical surface 88 connected to the inner horizontal surface 85 which is adapted to prevent radial displacement of the lid means relative the container means. The latch means further comprises spacer means 90 for spacing the lid means a predetermined distance, e.g. 0.2 inches, above the container means for providing an entrance opening into the device for slugs. The spacer means 90 comprises a vertically extending portion 92 of the latch means which terminates in a generally horizontally extending spacer surface 96. Surface 96 is adapted to abuttingly engage an upper surface 38 portion of the container means annular lip.

A lid centering means 20 is provided for facilitating initial central positioning of the lid means on the container means for enabling engagement of the annular lip of the container means by the latch means and for preventing subsequent radial shifting movement of the lid means in a direction perpendicular to a diameter of the lid means extending between the first and second latch means 70, 72 and for providing further spacer means for spacing the lid means from the container means by the predetermined distance mentioned above for providing the entrance opening 17 for slugs. The centering means 20 comprises a generally flat vertically and diametrically extending member 92 extending along a diameter of the lid means extending perpendicular to a diameter upon which the latch means 70, 72 are positioned. Member 92 has a pair of diametrically opposed outwardly positioned vertical surfaces 94, 96, FIG. 2, which are each approximately 0.8 inches in length and integrally connected at lower ends thereof with lower rounder shoulder portions 98, 100. Surfaces 98, 100 each have a radius of approximately 0.19 inches. The outwardly positioned vertical surfaces 94, 96 provide stop means for stopping radial displacement of the lid means. The lower rounded shoulder portions 98, 100 are adapted to engage and slide radially inwardly over an upper surface portion 84 of the container means annular lip for centrally positioning the lid means above the container means. The centering means 20 further comprises a pair of diametrically opposed horizontally extending spacer surface portions 102, 104, each having a length of approximately 0.4 inches, which are positioned at the predetermined distance (0.2 inches) below the lid means and which are adapted to abuttingly engage an upper surface portion 84 of the lip of the container means.

Due to the flexibility of annular lip 34 and its downwardly sloping configuration, it flexes outwardly when the lid means is pulled upwardly and the latch means are engaged with the lip. Thus, this outward flexing of the lip causes the lip to engage the latch means even more tightly to prevent the lid means from being removed.

It is contemplated that the inventive concepts herein described may be variously otherwise embodied and it is intended that the appended claims be construed to include alternative embodiments of the invention except insofar as limited by the prior art.

What is claimed is:

1. A slug trap device for use in a garden area or the like for luring and trappingly collecting slugs comprising:
    a container means for receiving and containing slug bait therein and for receiving and containing slugs therein which are attracted to said bait, having a circular bottom wall and an upstanding generally cylindrical sidewall integrally formed with said circular bottom wall and an outwardly and downwardly extending annular lip integrally formed with said sidewall at an upper portion thereof adapted to provide a ramp surface for facilitating the ingress of slugs into said container means and also adapted to coact with latch means, said bottom wall and said sidewall defining a cylindrical container cavity;
    lid means for covering said container means for shielding said container means from rain, said lid means comprising a generally conically shaped wall having an upper surface and a lower surface and adapted to extend a substantial radial distance beyond said container means annular lip for making the device resistant to being overturned by an animal, wind or the like;
    lid attachment means for releaseably attaching said lid means to said container means comprising at least a first and second circumferentially compact latch means fixedly attached to said lid means at said bottom surface thereof near the periphery of said lid means, said first and second latch means having an inwardly opening, generally hook shaped portion adapted to latchingly engage said outwardly and downwardly extending annular lip portion;
    lid axial spacing means fixedly associated with a peripheral portion of said lid means for uniformly spacing an axially opposite portion of said lid means at a relatively constant axial distance from said container means for providing an annular axial gap of sufficient dimension to allow ingress of slugs into said container threrethrough whereby a means of enabling slugs to enter said container means is provided without providing holes in said lid means or said container means; and
    said lid means being supported entirely on an upper peripheral portion of said container means whereby the need for lid support structure on said container means circular bottom wall is obviated.

2. The invention of claim 1 further comprising centering means for facilitating initial central positioning of said lid means on said container means for enabling engagement of said annular lip of said container means by said latch means and for preventing subsequent radial shifting movement of said lid means.

3. The invention of claim 2 wherein said latch means comprises first and second diametrically opposed radially and axially extending members fixedly mounted on said lower surface of said lid means and wherein said centering means comprises third and fourth diametrically opposed radially and axially extending members fixedly mounted on said lower surface of said lid means and oriented in generally perpendicular relationship to said first and second members.

4. The invention of claim 3, said spacer means comprising portions of said radially and axially extending members.

5. The invention of claim 1, wherein the height of said container means is less than 25% of the diameter of said lid means whereby a relatively low stable configuration is provided which, when positioned on a horizontal base surface, is self-uprighting subsequent to being tipped.

6. The invention of claim 1, said generally conically shaped wall of said lid means comprising integrally formed handle means therein adapted to facilitate grasping and carrying of the device by grasping of an upper surface of said lid means whereby a person carrying the device is not required to soil his hands by grasping a lower portion of said lid means or said container means.

7. The invention of claim 6 said handle means being provided by two recessed regions in said generally conically shaped wall, said recessed regions each comprising a generally planar bottom area extending perpendicularly of the central axis of said lid means and further comprising a circumferentially extending radially inwardly positioned area integrally connected to said handle bottom area and further comprising a pair of radially extending tapering side areas.

8. A slug trap device for use in a garden area or the like for luring and trappingly collecting slugs comprising:
    a container means for receiving and containing a non-toxic slug bait therein and for receiving and containing slugs therein which are attracted to said bait, having a circular bottom wall and an upstanding generally cylindrical sidewall integrally formed with said circular bottom wall and an outwardly and downwardly extending annular lip integrally formed with said sidewall at an upper portion thereof, said bottom wall and said sidewall defining a cylindrical container cavity;

lid means for covering said container means for shielding said container means from rain, said lid means comprising a generally conically shaped wall adapted to extend a substantial radial distance beyond said container means annular lip for making the device resistant to overturning by an animal, wind or the like, said generally conically shaped wall comprising integrally formed handle means therein adapted to facilitate grasping and carrying of the device by grasping of an upper surface of said lid means whereby a person carrying the device is not required to soil his hands by grasping a lower portion of said lid means or said container means which has been in contact with the ground or slugs;

said handle means being provided by two recessed regions in said generally conically shaped wall, said recessed regions each comprising a generally planar bottom area extending perpendicularly of the central axis of said lid means and further comprising a circumferentially extending radially inwardly positioned area integrally connected to said handle bottom area and further comprising a pair of radially extending tapering side areas, planes positioned in alignment with said sidewall areas of said recess intersecting approximately at the central axis of said lid means, said circumferential areas of said two recessed regions providing surfaces to be grasped for carrying said device;

lid attachment means for releasably attaching said lid means to said container means comprising a first and second latch means fixedly attached to said lid means at a bottom surface thereof in diametrically opposed relationship near the periphery of said lid means, said first and second latch means having a generally hook shaped portion adapted to latchingly engage said annular lip portion, said hook shaped portion comprising a rounded lower edge portion adapted to slide over an upper surface of said annular lip and having a generally horizontally extending inner surface which is adapted to snappingly engage a lower edge surface of said container annular lip subsequent to downward sliding movement of said hook portion lower edge portion over said annular lip upper surface to prevent removal of said lid means from said container means, said hook portion inner horizontal surface being positioned to enable said annular lip of said container means to be moved into nonengaging relationship therewith by inward compression of said sidewall of said container means is regions thereof proximate to said latch means by force applied by a person's thumb and fingers or by upwardly flexing of peripheral portions of said lid means at regions thereof where said latch means are attached to said lid means by grasping of said peripheral regions of said lid means with the finger of each of a person's hands and application of downward pressure at the center of said lid means with the thumbs of the person's hands, said hook means further comprising an inner vertical surface connected to said inner horizontal surface adapted to prevent radial displacement of said lid means relative said container means, said latch means further comprising spacer means for spacing said lid means a predetermined distance above said container means for providing an entrance opening into said device for slugs, said spacer means comprising a vertically extending portion of said latch means terminating in a generally horizontally extending spacer surface and adapted to abuttingly engage an upper surface portion of said container means annular lip; and centering means for facilitating initial central positioning of said lid means on said container means for enabling engagement of said annular lip of said container means by said latch means and for preventing subsequent radial shifting movement of said lid means in a direction perpendicular to a diameter of said lid means extending between said first and second latch means and for providing further spacer means for spacing said lid means from said container means by said predetermined distance for providing said entrance opening for slugs, said centering means comprising a generally flat vertically and diametrically extending mmeber extending along a diameter of said lid means extending perpendicular to a diameter upon which said latch means are positioned and having a pair of diametrically opposed outwardly positioned vertical surfaces approximately 0.8 inches in length integrally connected at lower ends thereof with lower rounder shoulder portions, said outwardly positioned vertical surfaces providing stop means for stopping radial displacement of said lid means, said lower rounded shoulder portions being adapted to engage and slid radially inwardly over an upper surface portion of said container means annular lip for centrally positioning said lid means above said container means, said centering means further comprising a pair of diametrically opposed horizontally extending spacer surface portions positioned at said predetermined distance below said lid means and adapted to abuttingly engage an upper surface portion of said lip portion of said container means.

9. A slug trap device for use in a garden area or the like for luring and trappingly collecting slugs comprising:

a container means for receiving and containing a non-toxic slug bait therein and for receiving and containing slugs therein which are attracted to said bait, having a circular bottom wall and an upstanding generally cylindrical sidewall integrally formed with said circular bottom wall and an outwardly and downwardly extending annular lip integrally formed with said sidewall at an upper portion thereof, said bottom wall and said sidewall defining a cylindrical container cavity said bottom wall having a diameter of approximately 3.8 inches, said sidewall having a height of approximately 1.3 inches, said annular lip portion having an outside diameter of approximately 4.5 inches and extending downwardly from the point of connection with said sidewall approximately 0.2 inches, and being inclined downwardly from a plane perpendicular to the top of said sidewall at an angle of approximately 30 degrees, said container means being constructed from one of polyethylene plastic and wax paper and having a substantially constant wall thickness of approximately 0.06 inches and being yellow in color;

lid means for covering said container means for shielding said container means from rain, said lid means comprising a generally conically shaped wall adapted to extend a substantial radial distance beyond said container means annular lip for making the device resistant to being overturned by an animal, wind or the like, said generally conically shaped wall comprising integrally formed handle means therein adapted to facilitate grasping and carrying of the device by grasping of an upper surface of said lid means whereby a person carrying the device is not required to soil his hands by grasping a lower portion of said lid means or said container means which has been in contact with the ground or slugs; said conical wall comprising a slope of approximately 15 degrees, a diameter of approximately 6.0 inches, a height of approximately 0.9 inches, and a wall thickness of approximately 0.06 inches and being constructed of polyethylene and being yellow in color;

said handle means being provided by two recessed regions in said generally conically shaped wall, said recessed regions each comprising a generally planar bottom area extending perpendicularly of the central axis of said lid means and further comprising a circumferentially extending radially inwardly positioned area integrally connected to said handle bottom area and further comprising a pair of radially extending tapering side areas, planes positioned in alignment with said sidewall areas of said recess intersecting approximately at the central axis of said lid means at an angle of approximately 60 degrees, said circumferential areas of said two recessed regions providing surfaces to be grasped for carrying said device, said distance between said circumferential areas of said two recessed regions being approximately 1.9 inches;

lid attachment means for releasably attaching said lid means to said container means comprising a first and second latch means fixedly attached to said lid means at a bottom surface thereof in diametrically opposed relationship near the periphery of said lid means, said first and second latch means having a generally hook shaped portion adapted to latchingly engage said annular lip portion, said hook shaped portion comprising a rounded lower edge portion having a radius of approximately 0.09 inches adapted to slide over an upper surface of said annular lip and having a generally horizontally extending inner surface having a length of approximately 0.03 inches and positioned approximately 2.25 inches at the most radially remote portion thereof from the central axis of said lid means which is adapted to snappingly engage a lower edge surface of said container annular lip subsequent to downward sliding movement of said hook portion lower edge portion over said annular lip upper surface to prevent removal of said lid means from said container means, said hook portion inner horizontal surface being positioned to enable said annular lip of said container means to be moved into nonengaging relationship therewith by inward compression of said sidewall of said container means in regions thereof proximate to said latch means by force applied by a person's thumb and fingers or by upwardly flexing of peripheral portions of said lid means at regions thereof where said latch means are attached to said lid means by grasping of said peripheral regions of said lid means with the finger of each of a person's hands and application of downward pressure at the center of said lid means with the thumbs of the person's hands, said hook means further comprising an inner vertical surface connected to said inner horizontal surface adapted to prevent radial displacement of said lid means relative said container means, said latch means further comprising spacer means for spacing said lid means a predetermined distance above said container means for providing an entrance opening into said device for slugs, said spacer means comprising a vertically extending portion of said latch means terminating in a generally horizontally extending spacer surface and adapted to abuttingly engage an upper surface portion of said container means annular lip; and centering means for facilitating initial central positioning of said lid means on said container means for enabling engagement of said annular lip of said container means by said latch means and for preventing subsequent radial shifting movement of said lid means in a direction perpendicular to diameter of said lid means extending between said first and second latch means and for providing further spacer means for spacing said lid means from said container means by said predetermined distance for providing said entrance opening for slugs, said centering means comprising a generally flat vertically and diametrically extending member extending along a diameter of said lid means extending perpendicular to a diameter upon which said latch means are positioned and having a pair of diametrically opposed outwardly positioned vertical surfaces approximately 0.8 inches in length integrally connected at lower ends thereof with lower rounder shoulder portions which each have a radius of approximately 0.19 inches, said outwardly positioned vertical surfaces providing stop means for stopping radial displacement of said lid means, said lower rounded shoulder portions being adapted to engage and slide radially inwardly over an upper surface portion of said container means annular lip for centrally positioning said lid means above said container means, said centering means further comprising a pair of diametrically opposed horizontally extending spacer surface portions each having a length of approximately 0.4 inches positioned at said predetermined distance below said lid means and adapted to abuttingly engage an upper surface portion of said lip portion of said container means.

* * * * *